(12) United States Patent
Diao et al.

(10) Patent No.: US 11,262,911 B2
(45) Date of Patent: Mar. 1, 2022

(54) INTEGRATED HOME KEY AND VIRTUAL KEY AREA FOR A SMART TERMINAL

(71) Applicant: JRD Communication (Shenzhen) LTD., Shenzhen (CN)

(72) Inventors: Zhiming Diao, Shenzhen (CN); Donghuang Li, Shenzhen (CN); Zewei Wu, Shenzhen (CN)

(73) Assignee: JRD Communication (Shenzhen) LTD., Shenzhen (CN)

( * ) Notice: Subject to any disclaimer, the term of this patent is extended or adjusted under 35 U.S.C. 154(b) by 0 days.

(21) Appl. No.: 16/639,600

(22) PCT Filed: Aug. 16, 2018

(86) PCT No.: PCT/CN2018/100831
§ 371 (c)(1),
(2) Date: Feb. 17, 2020

(87) PCT Pub. No.: WO2019/034110
PCT Pub. Date: Feb. 21, 2019

(65) Prior Publication Data
US 2021/0132791 A1    May 6, 2021

(30) Foreign Application Priority Data

Aug. 17, 2017 (CN) .......................... 201710707638.2

(51) Int. Cl.
*G06F 3/0488* (2013.01)
*H04M 1/72466* (2021.01)
*G06F 3/04886* (2022.01)

(52) U.S. Cl.
CPC .... *G06F 3/04886* (2013.01); *H04M 1/72466* (2021.01); *G06F 2203/04803* (2013.01); *H04R 2430/01* (2013.01)

(58) Field of Classification Search
CPC ........ G06F 3/04886; G06F 2203/0483; H04M 1/72466; H04R 3/04; H04R 2430/01
See application file for complete search history.

(56) References Cited

U.S. PATENT DOCUMENTS

| 2012/0154304 A1* | 6/2012 | Yoon | ..................... G06F 1/1643 345/173 |
| 2013/0002802 A1* | 1/2013 | Mock | .................. G06F 3/04883 348/14.03 |

(Continued)

FOREIGN PATENT DOCUMENTS

| CN | 105389102 | | 3/2016 |
| CN | 105389102 A | * | 3/2016 |

(Continued)

OTHER PUBLICATIONS

International Search Report and the Written Opinion dated Nov. 5, 2018 From the International Searching Authority Re. Application No. PCT/CN2018/100831 and Its Translation of Search Report Into English. (11 Pages).

*Primary Examiner* — Justin R. Blaufeld

(57) ABSTRACT

A key control method, a storage medium, and a smart terminal are provided, wherein the method includes dividing a virtual key area over a touch screen of a smart terminal, and disposing a home key under the touch screen; and detecting different touch operations received by the virtual key area and different pressing operations of the home key, and performing different operations correspondingly by the smart terminal.

6 Claims, 2 Drawing Sheets

(56) References Cited

U.S. PATENT DOCUMENTS

| | | | | |
|---|---|---|---|---|
| 2013/0324089 A1* | 12/2013 | Kim | ............. | H04W 12/06 |
| | | | | 455/411 |
| 2014/0189608 A1* | 7/2014 | Shuttleworth | ........ | G06F 3/0484 |
| | | | | 715/863 |
| 2014/0320434 A1* | 10/2014 | Pantel | ................ | G06F 3/04883 |
| | | | | 345/173 |
| 2017/0212631 A1* | 7/2017 | Kim | ................ | G06F 3/04883 |
| 2017/0308225 A1* | 10/2017 | Baek | ............. | G06F 3/0482 |
| 2018/0139323 A1* | 5/2018 | Kim | ............. | G06F 3/041 |
| 2018/0173465 A1* | 6/2018 | Tanaka | ............. | G06F 3/0412 |
| 2018/0183975 A1* | 6/2018 | Horibe | ............. | G09G 5/00 |
| 2018/0240122 A1* | 8/2018 | Lee | ............. | H04M 1/72454 |
| 2018/0335936 A1* | 11/2018 | Missig | ............. | G06F 3/04817 |
| 2019/0095077 A1* | 3/2019 | Mori | ............. | H04M 1/72469 |
| 2020/0379598 A1* | 12/2020 | Kim | ............. | G06F 3/0484 |

FOREIGN PATENT DOCUMENTS

| | | | |
|---|---|---|---|
| CN | 106293422 | | 1/2017 |
| CN | 106325594 | | 2/2017 |
| CN | 206133534 | | 4/2017 |
| CN | 106843573 | | 6/2017 |
| CN | 106843573 A | * | 6/2017 |
| CN | 107506121 | | 12/2017 |
| WO | WO 2019/034110 | | 2/2019 |

* cited by examiner

INTEGRATED HOME KEY AND VIRTUAL KEY AREA FOR A SMART TERMINAL

RELATED APPLICATIONS

This application is a National Phase of PCT Patent Application No. PCT/CN2018/100831 having International filing date of Aug. 16, 2018, which claims the benefit of priority of Chinese Patent Application No. 201710707638.2 filed on Aug. 17, 2017. The contents of the above applications are all incorporated by reference as if fully set forth herein in their entirety.

FIELD AND BACKGROUND OF THE INVENTION

The invention relates to the field of smart terminals, and particularly relates to a bottom control method, a storage medium, and a smart terminal.

At present, smart terminals such as mobile phones and tablet computers basically have multiple physical keys, such as the "home" key, the switch key, the volume key, etc. which will destroy the structural integrity of the mobile phone and the manufacturing process of the smart terminals is cumbersome, and users often need to perform a large range of hand movements when using these keys, which leads to inconvenience for users when using smart terminals. In addition, too many physical keys are set which causes too many gaps. This makes it easy for dust to enter the smart terminal from the gaps between the physical keys and affects service life of the smart terminal.

Therefore, the existing technology needs to be improved and developed.

SUMMARY OF THE INVENTION

The embodiments of the present invention provide a key control method, a storage medium, and a smart terminal, which can solve the problems that the control methods of multiple physical keys of a smart terminal in the prior art easily cause inconvenience for operation and easy entry of dust from the gaps of the physical keys.

In a first aspect, an embodiment of the present invention provides a key control method, which includes the following steps:

dividing a virtual key area over a touch screen of a smart terminal, and disposing a home key under the touch screen; and detecting different touch operations received by the virtual key area and different pressing operations of the home key, and performing different operations correspondingly by the smart terminal.

Furthermore, in the key control method, wherein the step of detecting different touch operations received by the virtual key area and different pressing operations of the home key, and performing different operations correspondingly by the smart terminal comprises:

the smart terminal performs operations of background switching and volume up or down accordingly when different gesture operations received by the virtual key area are detected; and the smart terminal performs operations of returning to a main interface, returning to a previous interface, turning on or off, or fingerprint recognition according to duration and intensity of the pressing when the home key receives a gesture of pressing.

Furthermore, in the key control method, wherein the step of the smart terminal performs operations of returning to a main interface, returning to a previous interface, turning on or off, or fingerprint recognition according to duration and intensity of the pressing when the home key receives a gesture of pressing comprises:

performing the operation of returning to the previous interface or fingerprint recognition according to a status of the smart terminal when the home key is slightly touched;

performing the operation of returning to the main interface by the smart terminal when the home key is pressed for a short time duration; or performing the operation of turning on or off by the smart terminal when the home key is long pressed.

Furthermore, in the key control method, wherein the virtual key area is disposed in a lower area of the touch screen.

Furthermore, in the key control method, wherein the virtual key area comprises a first functional area, a second functional area, and a third functional area which are laterally arranged with each other; wherein the smart terminal performs volume up when the first functional area receives a swipe gesture to the left; the smart terminal performs volume down when the second functional area receives a swipe gesture to the right; and the smart terminal performs background switching when the third functional area receives a swipe up gesture to the top.

Furthermore, in the key control method, wherein the first functional area is located on the left side of the home key, the second functional area is located on the right side of the home key, and the third functional area is located on the left side of the first functional area or the right side of the second functional area.

Furthermore, in the key control method, wherein there are two third functional areas respectively disposed on a left side of the first functional area and a right side of the second functional area.

Furthermore, in the key control method, wherein the virtual key area and the home key communicate with an touch screen module LCM/TP and a CPU through display serial interface (DSI) or inter-integrated circuit (I$^2$C) or serial peripheral interface (SPI).

In a second aspect, an embodiment of the present invention provides a storage medium having a plurality of instructions stored therein, wherein the instructions are suitable for being loaded by a processor and executing following steps:

dividing a virtual key area over a touch screen of a smart terminal, and disposing a home key under the touch screen; and detecting different touch operations received by the virtual key area and different pressing operations of the home key, and performing different operations correspondingly by the smart terminal.

Furthermore, in the storage medium, wherein the step of detecting different touch operations received by the virtual key area and different pressing operations of the home key, and performing different operations correspondingly by the smart terminal comprises:

the smart terminal performs operations of background switching and volume up or down accordingly when different gesture operations received by the virtual key area are detected; and the smart terminal performs operations of returning to a main interface, returning to a previous interface, turning on or off, or fingerprint recognition according to duration and intensity of the pressing when the home key receives a gesture of pressing.

Furthermore, in the storage medium, the virtual key area is disposed in a lower area of the touch screen.

In an third aspect, an embodiment of the present invention provides a smart terminal, comprising:

a processor adapted to implement instructions; and a storage medium adapted to storing a plurality of instructions, and the instructions are adapted to be loaded by a processor to execute following steps:

dividing a virtual key area over a touch screen of a smart terminal, and disposing a home key under the touch screen; and detecting different touch operations received by the virtual key area and different pressing operations of the home key, and performing different operations correspondingly by the smart terminal, wherein the operations comprise background switching, returning to a main interface, returning to a previous interface, turning on or off, or fingerprint recognition performed by the smart terminal.

Furthermore, in the smart terminal, the step of detecting different touch operations received by the virtual key area and different pressing operations of the home key, and performing different operations correspondingly by the smart terminal performed by the processor comprises:

the smart terminal performs operations of background switching and volume up or down accordingly when different gesture operations received by the virtual key area are detected; and the smart terminal performs operations of returning to a main interface, returning to a previous interface, turning on or off, or fingerprint recognition according to duration and intensity of the pressing when the home key receives a gesture of pressing.

Furthermore, in the smart terminal, the step of that the smart terminal performs operations of returning to a main interface, returning to a previous interface, turning on or off, or fingerprint recognition according to duration and intensity of the pressing when the home key receives a gesture of pressing performed by the processor comprises:

performing the operation of returning to the previous interface or fingerprint recognition according to a status of the smart terminal when the home key is slightly touched; performing the operation of returning to the main interface by the smart terminal when the home key is pressed for a short time duration; or performing the operation of turning on or off by the smart terminal when the home key is long pressed.

Furthermore, in the smart terminal, the virtual key area is disposed in a lower area of the touch screen.

Furthermore, in the smart terminal, the virtual key area comprises a first functional area, a second functional area, and a third functional area which are laterally arranged with each other; the smart terminal performs volume up when the first functional area receives a swipe gesture to the left; the smart terminal performs volume down when the second functional area receives a swipe gesture to the right; or the smart terminal performs background switching when the third functional area receives a swipe up gesture to the top.

Furthermore, in the smart terminal, the first functional area is located on the left side of the home key, the second functional area is located on the right side of the home key, and the third functional area is located on the left side of the first functional area or the right side of the second functional area.

Furthermore, in the smart terminal, there are two third functional areas respectively disposed on a left side of the first functional area and a right side of the second functional area.

Furthermore, in the smart terminal, wherein the smart terminal further comprises a touch screen module, and the virtual key area and the home key are disposed in the touch screen module, and the virtual key area and the home key communicate with a touch screen module LCM/TP and a CPU through display serial interface (DSI) or inter-integrated circuit ($I^2C$) or serial peripheral interface (SPI).

Furthermore, in the smart terminal further comprises an external IC, and the external IC is used to provide a backlight driver and a gate driver for the touch screen module that are serially or parallelly connected.

The key control method, storage medium and smart terminal provided by the present invention, wherein the method comprises: dividing a virtual key area over a touch screen of a smart terminal, and disposing a home key under the touch screen; and performing operations of background switching, returning to a main interface, returning to a previous interface, turning on or off, or fingerprint recognition correspondingly by the smart terminal through detecting different touch operations received by the virtual key area and different pressing operations of the home key. That is, functions of present multiple physical keys such as home key, switch key, and volume key that can be realized. The invention solves the problems that the method for controlling multiple physical keys of a smart terminal in the prior art easily causes inconvenience in operation and that dust can easily enter through the gap between the physical keys.

DESCRIPTION OF SPECIFIC EMBODIMENTS OF THE INVENTION

The present invention provides a key control method, a storage medium, and a smart terminal. In order to make the purpose, technical solution, and effect of the present invention clearer and specific, the present invention is further described in detail below. It should be understood that the specific embodiments described herein are only used to explain the present invention and are not intended to limit the present invention.

Figure 1:
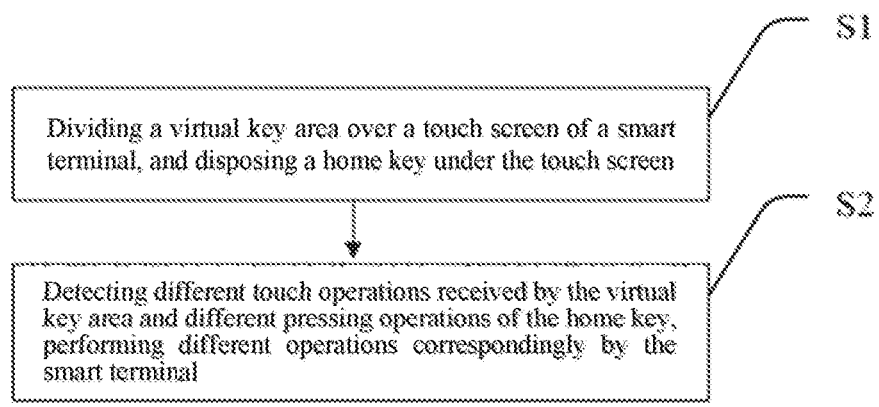
FIG. 1 is a flowchart of a preferred embodiment of a key control method provided by the present invention.

FIG. 1 is a flowchart of a preferred embodiment of a key control method provided by the present invention. As shown in FIG. 1, the method comprises steps of:

S1: dividing a virtual key area over a touch screen of a smart terminal, and disposing a home key under the touch screen; and S2: detecting different touch operations received by the virtual key area and different pressing operations of the home key, and performing different operations correspondingly by the smart terminal.

At present, smart terminals such as mobile phones and tablet computers basically have multiple physical keys, such as multiple physical keys such as a home key, a switch key, and a volume key.

In the present invention, a virtual key area is divided over a touch screen of a smart terminal, and a home key is disposed under the touch screen at the same time. Operations of background switching, returning to a main interface, returning to a previous interface, turning on or off, or fingerprint recognition are performed correspondingly by the smart terminal through detecting different touch operations received by the virtual key area and different pressing operations of the home key. Thus, functions of present multiple physical keys such as home key, switch key, and volume key that can be realized.

In the step S2, the smart terminal performs operations of background switching and volume up or down accordingly when different gesture operations received by the virtual key area are detected, and the smart terminal performs operations of returning to a main interface, returning to a previous interface, turning on or off, or fingerprint recognition according to duration and intensity of the pressing when the home key receives a gesture of pressing.

Preferably, according to the operating habits of most users, the smart terminal performs volume up when the first functional area receives a swipe gesture to the left, the smart terminal performs volume down when the second functional area receives a swipe gesture to the right, and the smart terminal performs background switching when the third function area receives a swipe up gesture to the top.

Figure 2:
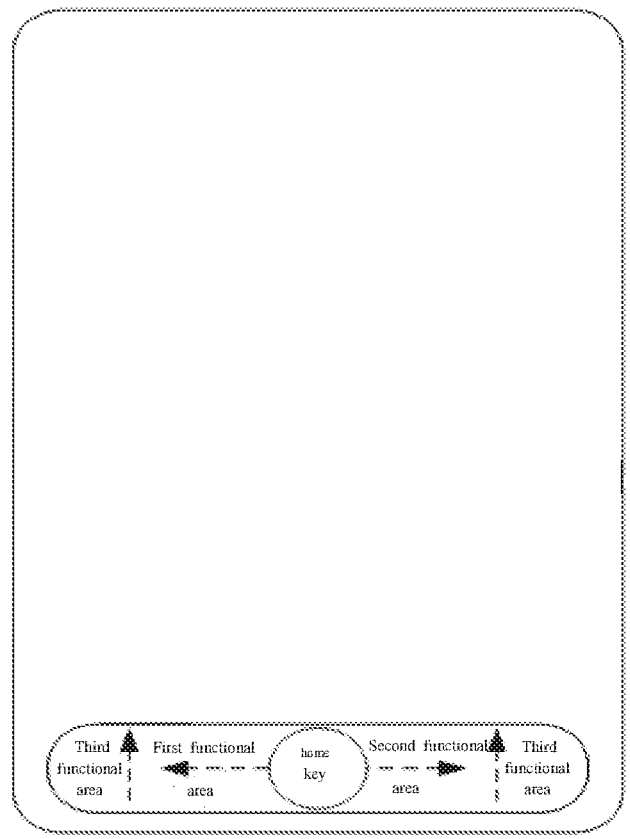
FIG. 2 is a schematic structural diagram of a smart terminal according to an embodiment of the present invention.

More preferably, as shown in FIG. 2, a virtual key area 10 is disposed in a lower area of a touch screen 1 in order to be closer to a home key 20 and makes the keys more compact and easier to operate.

Specifically, the virtual key area 10 comprises a first functional area X, a second functional area Y, and a third functional area Z which are laterally arranged with each other. The smart terminal performs volume up when the first functional area X receives a swipe gesture to the left. The smart terminal performs volume down when the second functional area Y receives a swipe gesture to the right. The smart terminal performs background switching when the third functional area Z receives a swipe up gesture to the top. In the present invention, the virtual key area 10 is further divided into the first functional area X, the second functional area Y, and the third functional area Z. The first functional area X receives a swipe gesture to the left and is silence to other touch operations to perform volume up by the smart terminal. The second functional area Y receives a swipe gesture to the right and is silence to other touch operations to perform volume down by the smart terminal. The third functional area Z receives a swipe up gesture to the top and is silence to other touch operations to perform background switching by the smart terminal. This can well control the occurrence of misoperations.

More preferably, the virtual key area is set to a long-stripe shape, and the first functional area X is located on the left side of the home key 20, the second functional area Y is located on the right side of the home key 20, and the third functional area Z is located on the left side of the first functional area X or the right side of the second functional area Y. In this way, the space around the home key 20 can be used, and the overall key structure is more compact and beautiful, which is more convenient for users to operate.

Even more preferably, there are two third functional areas Z respectively disposed on a left side of the first functional area X and a right side of the second functional area Y. That is, touching the left part of the virtual key area 10 upwards or touching the right part of the virtual key area 10 upwards can control the smart terminal to perform operations of background switching, so as to satisfy users who are accustomed to left-hand operation and right-hand operation at the same time.

In the above key control method, the operation of returning to the previous interface or fingerprint recognition is performed according to a status of the smart terminal when the home key 20 is slightly touched. The operation of returning to the main interface by the smart terminal is performed when the home key 20 is pressed for a short time duration. The operation of turning on or off by the smart terminal is performed when the home key 20 is long pressed. Specifically, the operation of returning to the previous interface or fingerprint recognition is performed according to a status of the smart terminal when the home key 20 is touched for less than three seconds. The operation of returning to the main interface by the smart terminal is performed when the home key 20 is pressed for three seconds or more. The operation of turning on or off by the smart terminal is performed when the home key 20 is pressed for more than three seconds.

Figure 3:
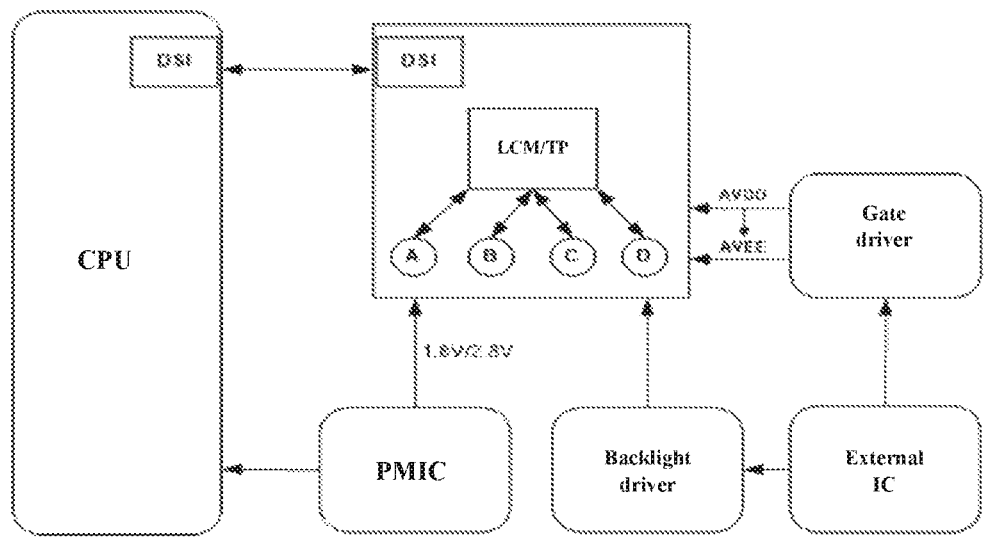
FIG. 3 is a hardware design architecture diagram of a smart terminal according to an embodiment of the present invention.

In the present invention, as shown in FIG. 3, four sub-functional modules A, B, C, and D corresponding to the first functional area X, the second functional area Y, the third functional area Z, and the home key 20 are respectively disposed in the touch screen module LCM/TP. Each sub-functional module communicates with the touch screen module and a CPU through display serial interface (DSI) or inter-integrated circuit ($I^2C$) or serial peripheral interface (SPI). At the same time, the sub-functional module D also communicates with a fingerprint module integrated in the smart terminal to realize a fingerprint recognition function. The power management system (PMIC) of the smart terminal provides a safe voltage of 1.8V/2.8V for the entire system. At the same time, the smart terminal of the present invention is also provided with an external IC, which is used to provide a backlight driver and a gate driver for the touch screen module that are serially or parallelly connected to reduce loading of the main control CPU.

Obviously, the smart terminal in the present invention may be a mobile phone or a tablet computer.

Based on the above method, the present invention also provides a storage medium having a plurality of instructions stored therein, wherein the instructions are suitable for being loaded by a processor and executing the key control method as described above.

A person of ordinary skill in the art may understand that all or part of the steps in the various methods of the foregoing embodiments may be implemented by a program instructing related hardware. The program may be stored in a computer-readable storage medium. The storage medium may comprise read-only memories (ROM), random-access memories (RAM), magnetic disks or optical disks, etc.

In one specific embodiment, the instructions are suitable for being loaded by a processor and executing following steps:

dividing a virtual key area over a touch screen of a smart terminal, and disposing a home key under the touch screen; and detecting different touch operations received by the virtual key area and different pressing operations of the home key, and performing different operations correspondingly by the smart terminal.

Wherein the step of detecting different touch operations received by the virtual key area and different pressing operations of the home key, and performing different operations correspondingly by the smart terminal comprises:

the smart terminal performs operations of background switching and volume up or down accordingly when different gesture operations received by the virtual key area are detected; and the smart terminal performs operations of returning to a main interface, returning to a previous interface, turning on or off, or fingerprint recognition according to duration and intensity of the pressing when the home key receives a gesture of pressing.

Wherein the virtual key area is disposed in a lower area of the touch screen.

Based on the above method, the present invention also provides a smart terminal. Please refer to FIG. 3, which is a hardware design architecture diagram of a smart terminal according to an embodiment of the present invention, comprising:

a processor adapted to implement instructions; and a storage medium adapted to storing a plurality of instructions, and the instructions are adapted to be loaded by a processor to execute the key control method as mentioned above.

Figure 4:
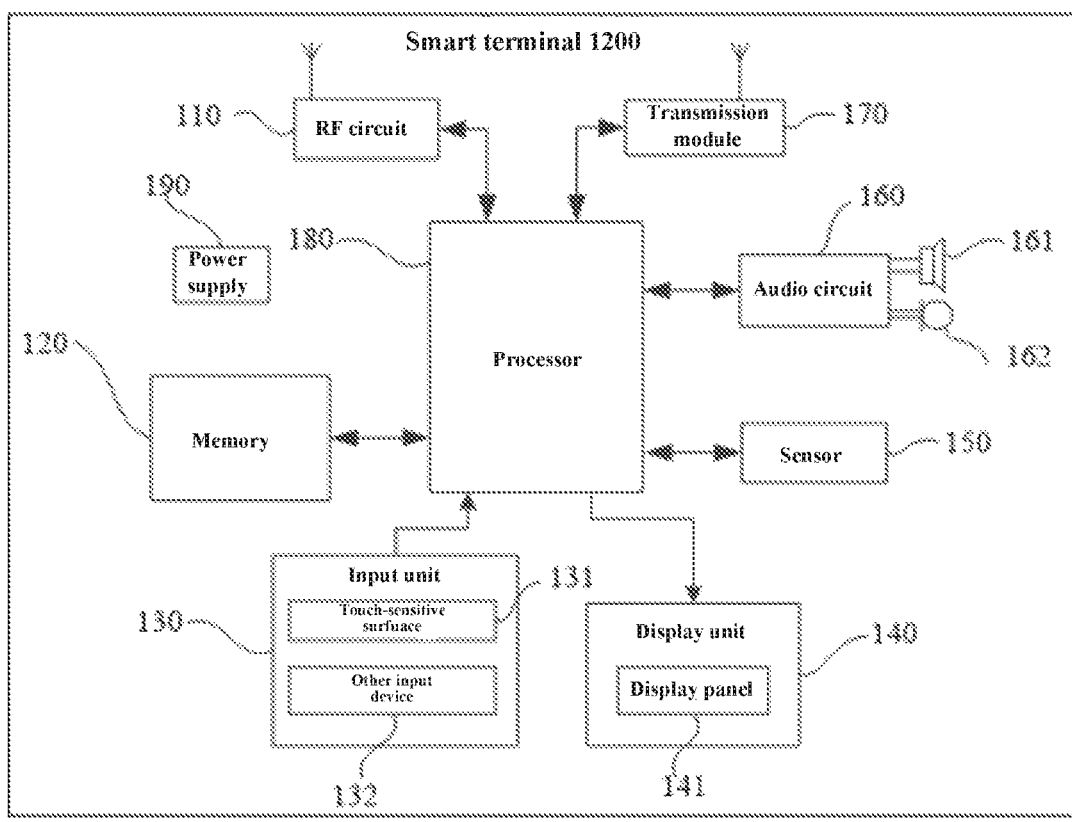
FIG. 4 is a specific structural block diagram of a smart terminal according to an embodiment of the present invention.

FIG. 4 shows a specific structural block diagram of a smart terminal according to an embodiment of the present invention. The smart terminal can be used to implement the method, storage medium, and smart terminal for automatic classification of bills provided in the foregoing embodiments. The smart terminal 1200 may be a smart phone or a tablet computer.

As shown in FIG. 4, the smart terminal 1200 may comprise an RF (Radio Frequency, radio frequency) circuit 110, a memory 120 comprising one or more (only one shown in the figure) computer-readable storage medium, an input unit 130, and a display unit. 140, a sensor 150, an audio circuit 160, a transmission module 170, a processor 180 comprising one or more (only one shown in the figure) processing core, a power supply 190, and other components. Those skilled in the art can understand that the structure of the smart terminal 1200 shown in FIG. 4 does not constitute a limitation on the smart terminal 1200, and may comprise more or fewer components than shown in the figure, or combine some components or different component layout. Wherein:

The RF circuit 110 is used to receive and send electromagnetic waves, to realize mutual conversion between electromagnetic waves and electrical signals, and to communicate with a communication network or other equipment. The RF circuit 110 may comprise various existing circuit elements for performing these functions, such as an antenna, a radio frequency transceiver, a digital signal processor, an encryption/decryption chip, a subscriber identity module (SIM) card, a memory, and the like. The RF circuit 110 can communicate with various networks such as an internet, an intranet, and a wireless network, or communicate with other devices through a wireless network. The wireless network may comprise a cellular telephone network, a wireless local area network, or a metropolitan area network. The above wireless network can use various communication standards, protocols and technologies, including but not limited to the Global System for Mobile Communication (GSM), Enhanced Data GSM Environment (EDGE), and broadband code Wideband Code Division Multiple Access (WCDMA), Code Division Access (CDMA), Time Division Multiple Access (TDMA), Wireless Fidelity (Wi-Fi) (such as the Institute of Electrical and Electronics Engineers' standards IEEE 802.11a, IEEE 802.11b, IEEE802.11g and/or IEEE 802.11n), Voice over Internet Protocol (VoIP), Worldwide Interoperability for Microwave Access (Wi-Max), other protocols for mail, instant messaging, and short messaging, and any other suitable communication protocol, even those that have not yet been developed.

The memory 120 may be used to store software programs and modules, such as the automatic bill classification method, storage medium, and program instructions/modules corresponding to the smart terminal in the foregoing embodiment. The processor 180 runs the software programs and modules stored in the memory 120 to thereby execute various functional applications and data processing, that is to realize the function of automatic classification of bills. The memory 120 may comprise a high-speed random-access memory, and may further comprise a non-volatile memory, such as one or more magnetic storage devices, a flash memory, or other non-volatile solid-state memory. In some embodiments, the memory 120 may further include a memory remotely set with respect to the processor 180, and these remote memories may be connected to the smart terminal 1200 through a network. Examples of the foregoing network comprise, but are not limited to, an internet, an intranet, a local area network, a mobile communication network, and combinations thereof. The memory 120 may be a storage medium as described above.

The input unit 130 may be used to receive inputted numeric or character information, and generate a keyboard, mouse, joystick, optical or trackball signal input related to user settings and functional control. Specifically, the input unit 130 may comprise a touch-sensitive surface 131 and other input devices 132. The touch-sensitive surface 131, also known as a touch display screen or a touchpad, can collect user's touch operations on or near it (for example, the user uses a finger, a stylus or any suitable object or accessory on the touch-sensitive surface 131 or near the touch-sensitive surface 131), and drive the corresponding connection device according to a preset program. Optionally, the touch-sensitive surface 131 may comprise two parts, a touch detection device and a touch controller. Among them, the touch detection device detects the user's touch position, and detects the signal brought by the touch operation, and transmits the signal to the touch controller; the touch controller receives touch information from the touch detection device, converts it into contact coordinates, and sends It is given to the processor 180, and can receive the command sent by the processor 180 and execute it. In addition, the touch-sensitive surface 131 can be realized in various ways such as resistive, capacitive, infrared, and surface acoustic waves. In addition to the touch-sensitive surface 131, the input unit 130 may include other input devices 132. Specifically, the other input devices 132 may comprise, but are not limited to, one or more of a physical keyboard, function keys (such as volume control keys, switch keys, etc.), a trackball, a mouse, a joystick, and the like.

The display unit 140 may be configured to display information input by the user or information provided to the user and various graphical user interfaces of the smart terminal 1200. These graphical user interfaces may be composed of graphics, text, icons, videos, and any combination thereof. The display unit 140 may comprise a display panel 141. Optionally, the display panel 141 may be configured in the form of an LCD (Liquid Crystal Display) or an OLED (Organic Light-Emitting Diode). Further, the touch-sensitive surface 131 may cover the display panel 141. When the touch-sensitive surface 131 detects a touch operation on or near the touch-sensitive surface 131, it is transmitted to the processor 180 to determine the type of the touch event. The type provides corresponding visual output on the display panel 141. Although in FIG. 3, the touch-sensitive surface 131 and the display panel 141 implement input and output functions as two independent components. In some embodiments, the touch-sensitive surface 131 and the display panel 141 may be integrated to implement input and output functions. The display interface of the smart terminal in the foregoing embodiment may be represented by the display unit 140, and the content associated with the current mobile payment information and the current store information may be displayed on the display unit 140 of the smart terminal 1200. That is, the displayed content of the display interface may be displayed by the display unit 140.

The smart terminal 1200 may further comprise at least one sensor 150, such as a light sensor, a motion sensor, and other sensors. Specifically, the light sensor may include an ambient light sensor and a proximity sensor. The ambient light sensor may adjust the brightness of the display panel 141 according to the brightness of the ambient light. The proximity sensor may close the display panel 141 when the smart terminal 1200 moves to the ear and/or backlight. As a kind of motion sensor, the gravity acceleration sensor can detect the magnitude of acceleration in various directions (generally three axes). It can detect the magnitude and direction of gravity when it is stationary. It can be used to identify the attitude of mobile phones (such as horizontal and vertical screen switching, Games, magnetometer attitude calibration), vibration recognition related functions (such as pedometer, tap), etc. As for the smart terminal 1200, other sensors such as gyroscopes, barometers, hygrometers, thermometers, infrared sensors, etc. can be configured here, and are not mentioned here again.

The audio circuit 160, the speaker 161, and the microphone 162 may provide an audio interface between the user and the smart terminal 1200. The audio circuit 160 may transmit the received electrical data converted electric signal to the speaker 161, and the speaker 161 converts it into a sound signal for output. On the other hand, the microphone 162 converts the collected sound signal into an electric signal, and the audio circuit 160 After receiving, it is converted into audio data, and then the audio data output processor 180 is processed, and then sent to, for example, another terminal via the RF circuit 110, or the audio data is output to the memory 120 for further processing. The audio circuit 160 may further comprise an earphone jack to provide communication between an external earphone and the smart terminal 1200.

The smart terminal 1200 can help users send and receive emails, browse web pages, and access streaming media through a transmission module 170 (such as a Wi-Fi module). It provides users with wireless broadband internet access. Although FIG. 3 shows the transmission module 170, it can be understood that it does not belong to the necessary configuration of the smart terminal 1200, and can be omitted as needed without changing the scope of the invention.

The processor 180 is a control center of the smart terminal 1200, and uses various interfaces and lines to connect various parts of the entire mobile phone, and runs or executes software programs and/or modules stored in the memory 120 and uses data stored in the memory 120 to execute various functions of smart terminal 1200 and process data, so as to monitor the mobile phone as a whole. Optionally, the processor 180 may comprise one or more processing cores. In some embodiments, the processor 180 may integrate an application processor and a modem processor, where the application processor mainly processes an operating system, a user interface, and applications, etc., and modem processors mainly handle wireless communications. It can be understood that the foregoing modem processor may not be integrated into the processor 180.

The smart terminal 1200 also comprises a power supply 190 (such as a battery) for supplying power to various components. In some embodiments, the power source can be logically connected to the processor 180 through a power management system, so as to manage functions such as charging, discharging, and power consumption through the power management system. The power supply 190 may also include one or more DC or AC power supplies, a recharging system, a power failure detection circuit, a power converter or inverter, a power supply status indicator, and other arbitrary components.

Although not shown, the smart terminal 1200 may further comprise a camera (such as a front camera, a rear camera), a Bluetooth module, and the like, and details are not described herein again. Specifically, in this embodiment, the display unit of the smart terminal is a touch screen display. The smart terminal further comprises a memory and one or more programs. One or more programs are stored in the memory, and are configured to be replaced by one or one. The above processor executes the one or more programs comprise instructions for performing the following operations:

dividing a virtual key area over a touch screen of a smart terminal, and disposing a home key under the touch screen; and detecting different touch operations received by the virtual key area and different pressing operations of the home key, and performing different operations correspondingly by the smart terminal, wherein the operations comprise background switching, returning to a main interface, returning to a previous interface, turning on or off, or fingerprint recognition performed by the smart terminal.

Wherein, the step of detecting different touch operations received by the virtual key area and different pressing operations of the home key, and performing different operations correspondingly by the smart terminal performed by the processor 180 comprises:

the smart terminal performs operations of background switching and volume up or down accordingly when different gesture operations received by the virtual key area are detected; and the smart terminal performs operations of returning to a main interface, returning to a previous interface, turning on or off, or fingerprint recognition according to duration and intensity of the pressing when the home key receives a gesture of pressing.

Wherein, the step of that the smart terminal performs operations of returning to a main interface, returning to a previous interface, turning on or off, or fingerprint recognition according to duration and intensity of the pressing when the home key receives a gesture of pressing performed by the processor 180 comprises:

performing the operation of returning to the previous interface or fingerprint recognition according to a status of the smart terminal when the home key is slightly touched; performing the operation of returning to the main interface by the smart terminal when the home key is pressed for a short time duration; or performing the operation of turning on or off by the smart terminal when the home key is long pressed.

Wherein the virtual key area is disposed in a lower area of the touch screen.

Wherein the virtual key area comprises a first functional area, a second functional area, and a third functional area which are laterally arranged with each other; the smart terminal performs volume up when the first functional area receives a swipe gesture to the left; the smart terminal performs volume down when the second functional area receives a swipe gesture to the right; or the smart terminal performs background switching when the third functional area receives a swipe up gesture to the top.

Wherein the first functional area is located on the left side of the home key, the second functional area is located on the right side of the home key, and the third functional area is located on the left side of the first functional area or the right side of the second functional area.

Wherein the smart terminal further comprises a touch screen module, and the virtual key area and the home key are disposed in the touch screen module, and the virtual key area and the home key communicate with a touch screen module LCM/TP and a CPU through display serial interface (DSI) or inter-integrated circuit (I²C) or serial peripheral interface (SPI).

Wherein the smart terminal further comprises an external IC, and the external IC is used to provide a backlight driver and a gate driver for the touch screen module that are serially or parallelly connected.

The technical details and benefits of the above smart terminal and storage medium have been described in detail in the above method, and are not repeated here.

In summary, in the key control method provided by the present invention, a virtual key area is divided over a touch screen of a smart terminal, and a home key is disposed under the touch screen. Operations of background switching, returning to a main interface, returning to a previous interface, turning on or off, or fingerprint recognition are performed correspondingly by the smart terminal through detecting different touch operations received by the virtual key area and different pressing operations of the home key. That is, functions of present multiple physical keys such as home key, switch key, and volume key that can be realized. The invention solves the problems that the method for controlling multiple physical keys of a smart terminal in the prior art easily causes inconvenience in operation and that dust can easily enter through the gap between the physical keys.

While the present disclosure has been described with the aforementioned preferred embodiments, it is preferable that the above embodiments should not be construed as limiting of the present disclosure. Anyone having ordinary skill in the art can make a variety of modifications and variations without departing from the spirit and scope of the present disclosure as defined by the following claims.

What is claimed is:

1. A key control method, comprising steps of:
    dividing a virtual key area over a touch screen of a smart terminal, and disposing a home key below a surface of the touch screen, wherein the virtual key area comprises a first functional area, a second functional area, and a third functional area which are laterally arranged with each other, the first functional area is located on the left side of the home key, the second functional area is located on the right side of the home key, and the third functional area is located on the left side of the first functional area or the right side of the second functional area; and
    detecting different touch operations received by the virtual key area and different pressing operations of the home key, and performing different operations correspondingly by the smart terminal, wherein:
    the smart terminal performs volume up when the first functional area receives a swipe gesture to the left;
    the smart terminal performs volume down when the second functional area receives a swipe gesture to the right; and
    the smart terminal performs background switching when the third functional area receives a swipe up gesture to the top.

2. The key control method according to claim 1, wherein the step of detecting different touch operations received by the virtual key area and different pressing operations of the home key, and performing different operations correspondingly by the smart terminal comprises:
    the smart terminal performs operations of background switching and volume up or down accordingly when different gesture operations received by the virtual key area are detected; and
    the smart terminal performs operations of returning to a main interface, returning to a previous interface, turning on or off, or fingerprint recognition according to duration and intensity of the pressing when the home key receives a gesture of pressing.

3. The key control method according to claim 2, wherein the step of the smart terminal performs operations of returning to a main interface, returning to a previous interface, turning on or off, or fingerprint recognition according to duration and intensity of the pressing when the home key receives a gesture of pressing comprises:
    performing the operation of returning to the previous interface or fingerprint recognition according to a status of the smart terminal when the home key is slightly touched;
    performing the operation of returning to the main interface by the smart terminal when the home key is pressed for a short time duration; or
    performing the operation of turning on or off by the smart terminal when the home key is long pressed.

4. The key control method according to claim 1, wherein the virtual key area is disposed in a lower area of the touch screen.

5. The key control method according to claim 1, wherein there are two third functional areas respectively disposed on a left side of the first functional area and a right side of the second functional area.

6. The key control method according to claim 1, wherein the virtual key area and the home key communicate with a touch screen module (LCM/TP) and a CPU through a display serial interface (DSI), an inter-integrated circuit (I²C), or a serial peripheral interface (SPI).

* * * * *